US009910453B2

(12) United States Patent
Wasserman et al.

(10) Patent No.: US 9,910,453 B2
(45) Date of Patent: Mar. 6, 2018

(54) HIGH VOLTAGE, HIGH EFFICIENCY SINE WAVE GENERATOR WITH PRE-SET FREQUENCY AND ADJUSTABLE AMPLITUDE

(71) Applicant: Novocure Limited, St. Helier (JE)

(72) Inventors: Yoram Wasserman, Haifa (IL); Edward Langerman, Netanya (IL); Mikhail Shtotland, Beer Sheva (IL); Sergei Kirillov, Shima (IL); Michael Krinitsky, Beersheva (IL); Victor Kaikov, Atlit (IL)

(73) Assignee: Novocure Limited, St. Helier (JE)

( * ) Notice: Subject to any disclaimer, the term of this patent is extended or adjusted under 35 U.S.C. 154(b) by 0 days.

(21) Appl. No.: 15/265,921

(22) Filed: Sep. 15, 2016

(65) Prior Publication Data

US 2017/0093277 A1    Mar. 30, 2017

Related U.S. Application Data

(60) Provisional application No. 62/232,762, filed on Sep. 25, 2015.

(51) Int. Cl.
| | |
|---|---|
| *H03L 5/00* | (2006.01) |
| *G06F 1/02* | (2006.01) |
| *H02M 1/12* | (2006.01) |
| *H02M 5/12* | (2006.01) |
| *H02M 7/5387* | (2007.01) |
| *H02M 7/493* | (2007.01) |

(52) U.S. Cl.
CPC ............ *G06F 1/022* (2013.01); *H02M 1/126* (2013.01); *H02M 5/12* (2013.01); *H02M 7/53871* (2013.01); *H02M 7/493* (2013.01); *H02M 2007/53878* (2013.01)

(58) Field of Classification Search
None
See application file for complete search history.

(56) References Cited

U.S. PATENT DOCUMENTS 7,805,201 B2    9/2010  Palti
8,576,592 B2 *  11/2013  Jones ...................... H02M 1/14
                                                            363/65

* cited by examiner

*Primary Examiner* — Lincoln Donovan
*Assistant Examiner* — Khareem E Almo
(74) *Attorney, Agent, or Firm* — Potomac Law Group, PLLC

(57) ABSTRACT

An apparatus for generating a sinusoid at a pre-set frequency f includes a DC power source with a controllable output voltage, a transformer, a power switch, a sequencer, and an output filter. The power switch is configured to apply the output of the DC power source to the primary of the transformer in either direction or to remain off based on control signals that are applied to its control input. The sequencer applies control signals to the control input in a choreographed sequence to form an oversampled version of a sine wave. The output filter is connected to the secondary of the transformer, and it passes the pre-set frequency f and attenuates frequencies above a cut-off frequency. In some preferred embodiments, the cut-off frequency is 3f and the transfer function of the output filter has a zero at 5f.

32 Claims, 6 Drawing Sheets

HIGH VOLTAGE, HIGH EFFICIENCY SINE WAVE GENERATOR WITH PRE-SET FREQUENCY AND ADJUSTABLE AMPLITUDE

CROSS REFERENCE TO RELATED APPLICATIONS

This Application claims the benefit of U.S. Provisional Application 62/232,762 filed Sep. 25, 2015, which is incorporated herein by reference in its entirety.

BACKGROUND

Class-D amplifiers are electronic amplifiers in which the amplifying device operates as an electronic switch, instead of as linear gain devices as in other amplifiers. In class-D amplifiers, the analog signal is amplified using a system of switches that convert the signal into a series of pulses by pulse width modulation, pulse density modulation or another method. The pulses that make up the amplified signals are then passed through a low pass filter that filters out the high frequency signal components to form an amplified version of the original signal. The filter is constructed from capacitive and inductive elements so that the energy losses associated with the filter are low. Class-D amplifiers are designed to track the input signal in real-time, and usually work in the frequency range of up to tens of kHz, making them suitable for amplifying audio signals.

The efficiency of class-D amplifiers is above 90%. This is because the amplified signal is binary and has segments in which the current passing through the switch is zero and the voltage finite, and segments in which the current through the switch is finite and the voltage is zero. In an electric circuit, heat loss is equal to the product of current and voltage. Therefore, in a system in which either the voltage or current are equal to zero most of the time, heat losses will be minimal. Class D amplifiers are therefore highly efficient amplifiers with minimal losses.

Using TTFields therapy to treat tumors is described in U.S. Pat. No. 7,805,201, and TTFields therapy requires the generation of a high voltage sinusoidal signal. Previously, generating this sinusoidal signal was implemented by generating a low amplitude signal with a function generator, then amplifying this signal using a linear amplifier and subsequently applying the signal to the electrodes that are positioned on the patient's body. The use of linear amplifier results in heat losses of close to 50%, reducing battery life, and complicating device design because a cooling system is required to dissipate the heat generated.

Implementing a high-efficiency digital signal generation/amplification architecture for TTFields would be beneficial. One possible approach for building such a system could be to replace the linear amplifier in the system with a Class-D amplifier. However, existing Class-D amplifier technology is not suitable for this task for two reasons. First, the signal distortion associated with Class-D amplifiers increases as the signal amplitude decreases, and TTFields requires sinewaves with very low levels of distortion at all signal levels. And second, TTFields therapy requires the generation of sinewaves at frequencies greater than 100 kHz. This requires very fast switches and complex control that are currently unavailable.

SUMMARY OF THE INVENTION

One aspect of the invention is directed to a first apparatus for generating a sinusoid at a pre-set frequency f. The first apparatus includes a DC power source having a voltage-control input that sets an output voltage of the DC power source, and also includes a transformer having a primary and a secondary. The first apparatus also has a power switch having a control input, and the power switch is configured to apply the output of the DC power source to the primary of the transformer in a first direction when a first control signal is applied to the control input, apply the output of the DC power source to the primary of the transformer in a second direction when a second control signal is applied to the control input, and remain off when neither the first control signal nor the second control signal is applied to the control input. The second direction is opposite to the first direction.

The first apparatus also has a sequencer that (a) applies the first control signal to the control input for a duration of T/3, then (b) waits for a duration of T/6, then (c) applies the second control signal to the control input for a duration of T/3, and then (d) waits for a duration of T/6, then continuously repeat the sequence (a), (b), (c), and (d). T is the reciprocal of the pre-set frequency f. The first apparatus also has an output filter connected to the secondary of the transformer. The output filter passes the pre-set frequency f and attenuates frequencies above a cut-off frequency. The cut-off frequency is between 2f and 4f, and the output filter has a transfer function with a zero at 5f.

Optionally, the first apparatus further includes a controller programmed to control an amplitude of the sinusoid at the pre-set frequency by adjusting a third control signal that is applied to the voltage-control input of the DC power source. Optionally, it may also include a sensor that detects an output current of the apparatus. The controller is programmed to increase the amplitude of the sinusoid when the detected output current is lower than a desired current, and to decrease the amplitude of the sinusoid when the detected output current is higher than the desired current. Optionally, the sequencer may be configured to inhibit generation of both the first control signal and the second control signal when the output current detected by the sensor is indicative of an error condition.

Optionally, the transfer function of the output filter in the first apparatus may have an additional zero at 7f. Optionally, this output filter may be a low pass elliptic filter. Optionally, the cut-off frequency of this output filter is at or near 3f.

Optionally, the frequency of the output filter of the first apparatus is at or near 3f.

Optionally, the output filter of the first apparatus is a multi-stage low pass LC filter, and a leakage inductance of the transformer provides at least half of the inductance of a first stage of the low pass LC filter. Optionally, the output filter of the first apparatus is a multi-stage low pass LC filter, and a leakage inductance of the transformer provides all of the inductance of a first stage of the low pass LC filter.

Optionally, the output filter of the first apparatus has an output impedance of 70 ohms. Optionally, the output filter of the first apparatus has an output impedance between 40 and 120 ohms. Optionally, the pre-set frequency f is 200 kHz. Optionally, the pre-set frequency f is 150 kHz. Optionally, the power switch of the first apparatus has an H-bridge configuration.

Another aspect of the invention is directed to a second apparatus for generating a sinusoid at a pre-set frequency f. The second apparatus includes n DC power sources, each of the n DC power sources having a voltage-control input that sets an output voltage of the respective power source, wherein n is a positive integer. The second apparatus also includes a transformer having a primary and a secondary, and a power switch having a control input. The power switch is configured to either (a) apply the output of a selected one of the n DC power sources to the primary of the transformer in a selected direction in response to 2n states of a control signal that is applied to the control input or (b) remain off in response to an additional state of the control signal.

The second apparatus also includes a sequencer that controls the generation an oversampled version of a sine wave that is sampled N times per cycle using evenly spaced samples that include a sampling point at 0°, where N=2+4n, by setting the output voltages of the n DC power sources to levels that are present on the oversampled version of the sine wave, and then sequencing the control signal through the 2n states and the additional state, so that each of the n DC power sources is applied to the primary of the transformer in each direction at appropriate times in a sequence so as to generate the oversampled version of the sine wave.

The second apparatus also includes an output filter connected to the secondary of the transformer. The output filter passes the pre-set frequency f and attenuates frequencies above a cut-off frequency, and the output filter has a transfer function with a zero at a frequency where a harmonic of the pre-set frequency f is expected to contain power. The controller controls an amplitude of the sinusoid by adjusting the output voltages of the n DC power sources via the voltage-control inputs, while maintaining a fixed ratio between the output voltages of each of the n DC power sources.

Optionally, the transfer function of the output filter in the second apparatus has an additional zero a next frequency where a harmonic of the pre-set frequency f is expected to contain power. Optionally, the cut-off frequency of the output filter in the second apparatus is at or near 3f. Optionally, the output filter in the second apparatus is a multi-stage low pass LC filter, and a leakage inductance of the transformer provides at least half of the inductance of a first stage of the low pass LC filter. Optionally, the output filter in the second apparatus is a multi-stage low pass LC filter, and a leakage inductance of the transformer provides all of the inductance of a first stage of the low pass LC filter.

Optionally, the second apparatus further includes a second output filter and a switch. The second output filter passes a second pre-set frequency f2 and attenuates frequencies above a second cut-off frequency. The second output filter has a transfer function with a zero at a frequency where a harmonic of the second pre-set frequency f2 is expected to contain power. The switch selectively connects either the output filter or the second output filter to the secondary of the transformer.

Optionally, the output filter of the second apparatus includes at least one component with a tunable reactance.

Another aspect of the invention is directed to a third apparatus for generating a sinusoid at a pre-set frequency f. The third apparatus includes n DC power sources, each of the n DC power sources having a voltage-control input that sets an output voltage of the respective power source, wherein n is a positive integer. The third apparatus also includes a power switch having output terminals and a control input. The power switch is configured to either (a) switch the output of a selected one of the n DC power sources across the output terminals in a selected direction in response to 2n states of a control signal that is applied to the control input or (b) remain off in response to an additional state of the control signal.

The third apparatus also includes a sequencer that controls the generation an oversampled version of a sine wave that is sampled N times per cycle using evenly spaced samples that include a sampling point at 0°, where N=2+4n, by setting the output voltages of the n DC power sources to levels that are present on the oversampled version of the sine wave, and then sequencing the control signal through the 2n states and the additional state, so that each of the n DC power sources is switched across the output terminals in each direction at appropriate times in a sequence so as to generate the oversampled version of the sine wave.

The third apparatus also includes an output filter that filters a signal received from the output terminals of the power switch. The output filter passes the pre-set frequency f and attenuates frequencies above a cut-off frequency, and the output filter has a transfer function with a zero at a frequency where a harmonic of the pre-set frequency f is expected to contain power. The controller controls an amplitude of the sinusoid by adjusting the output voltages of the n DC power sources via the voltage-control inputs, while maintaining a fixed ratio between the output voltages of each of the n DC power sources.

Optionally, the transfer function of the output filter in the third apparatus has an additional zero at a next frequency where a harmonic of the pre-set frequency f is expected to contain power. Optionally, the cut-off frequency of the output filter in the third apparatus is at or near 3f.

Optionally, the third apparatus further includes a second output filter and a switch. The second output filter passes a second pre-set frequency f2 and attenuates frequencies above a second cut-off frequency. The second output filter has a transfer function with a zero at a frequency where a harmonic of the second pre-set frequency f2 is expected to contain power. The switch selectively connects either the output filter or the second output filter to the secondary of the transformer.

Optionally, the output filter of the third apparatus includes at least one component with a tunable reactance.

Another aspect of the invention is directed to a first method for generating a sinusoid at a pre-set frequency f. The first method includes setting n DC power sources to respective output voltages, where n is a positive integer. The first method also includes generating an oversampled version of a sine wave that is sampled N times per cycle using evenly spaced samples that include a sampling point at 0°, where N=2+4n, by setting the output voltages of the n DC power sources to levels that are present on the oversampled version of the sine wave, and then switching the outputs of the n DC power sources to an output in a controlled sequence such that each of the n DC power sources is switched to the output in each direction at appropriate times in the sequence so as to generate the oversampled version of the sine wave.

The first method also includes filtering the oversampled version of the sine wave to pass the pre-set frequency f and attenuate frequencies above a cut-off frequency. The filtering implements a transfer function with a zero at a frequency where a harmonic of the pre-set frequency f is expected to contain power. The amplitude of the sinusoid is controlled by adjusting the output voltages of the n DC power sources.

Optionally, n in the first method equals 1. Optionally the cut-off frequency is at or near 3f.

Alternatively, n in the first method is greater than 1, and the amplitude of the sinusoid is controlled by adjusting the output voltages of the n DC power sources, while maintaining a fixed ratio between the output voltages of each of the n DC power sources.

Optionally, the transfer function in the first method has an additional zero at a next frequency where a harmonic of the pre-set frequency f is expected to contain power.

DESCRIPTION OF THE PREFERRED EMBODIMENTS

The embodiments described herein are useful in connection with generating TTFields, as described in U.S. Pat. No. 7,805,201, which is incorporated herein by reference. The embodiments described herein can be used to generate the high voltage sinusoidal signals, as required for TTFields, using a high efficiency architecture. This enables the reduction in size and weight of the device that generates the high voltage sinusoids and of the associated batteries.

Note that when generating a high-voltage signal for TTFields delivery, the exact shape of the signal is known at every moment (pure sine wave at a known frequency) and it is only the amplitude of the output signal that changes over time, based on external inputs (e.g., control based on the skin temperature of the patient). Furthermore, the rate at which the output signal has to change is very slow, as the decision to change the signal level is made a long time before the devices changes the level, on the timescale of one or more seconds. This relatively long timescale stands in contrast to the rapid response-time provided by conventional class-D amplifiers in which the exact shape of the input/output signals is unknown and changes are made in real-time on a millisecond or microsecond time scale.

The embodiments described herein generate high voltage sinusoidal signals by generating a specific pulse train that, when filtered using a specific low pass filter, will result in a low distortion sine wave of the desired amplitude and frequency.

Figure 1:
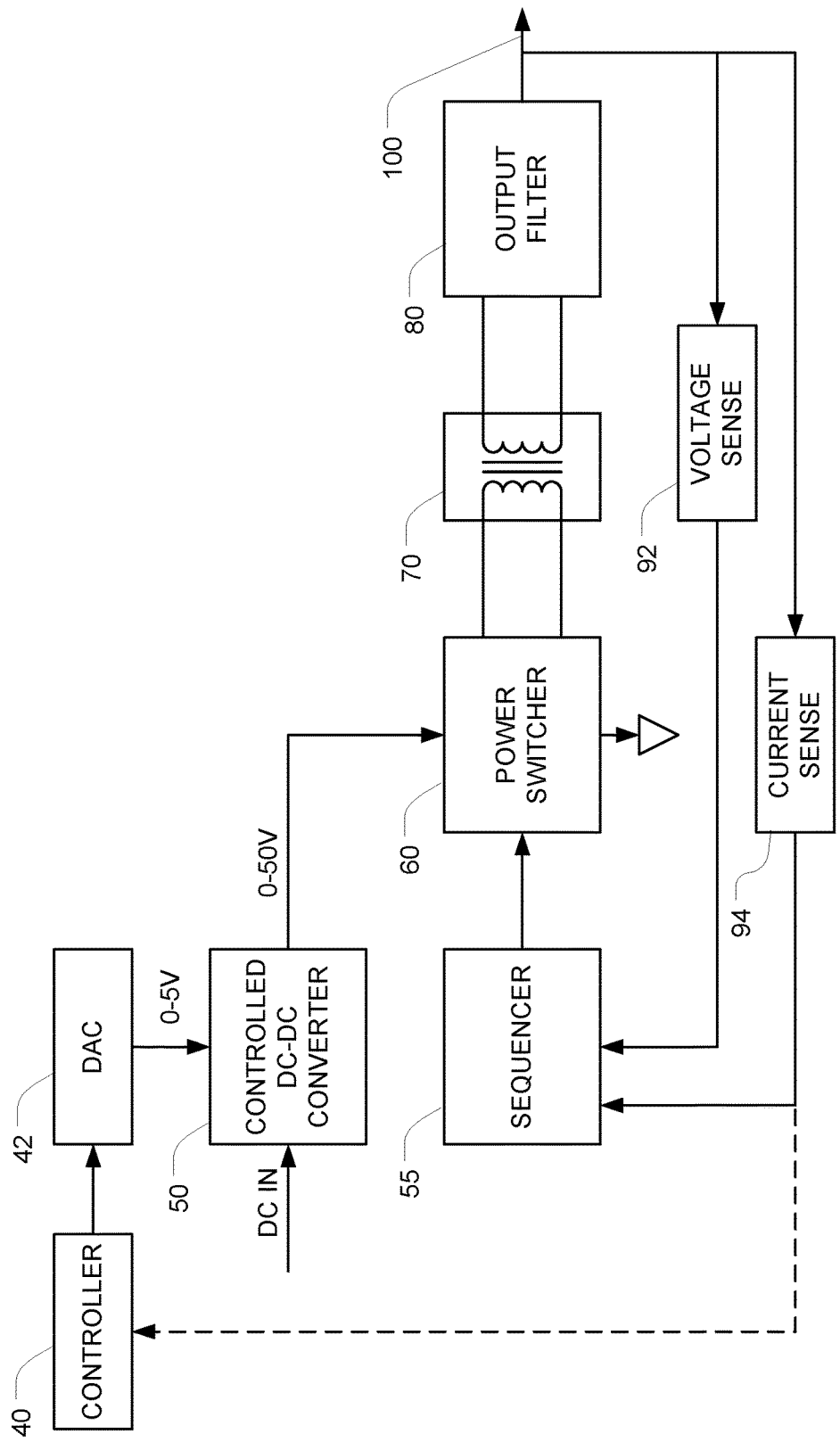
FIG. 1 is a block diagram of a first embodiment of a sinusoid generator that generates a sinusoid at a pre-set frequency f, with a controllable amplitude.

FIG. 1 is a block diagram of a first embodiment of a sinusoid generator that generates a sinusoid at a pre-set frequency f, with a controllable amplitude. Ultimately, the amplitude of the output sinusoid will be proportional to the output of the DC power source 50, which is preferably a controlled DC-DC converter.

In the illustrated embodiment, the DC to DC converter 50 is configured to multiply an analog voltage-control input signal by 10, so when a 1 V voltage-control signal is applied the output will be 10 V, and when a 5 V voltage-control signal is applied the output will be 50 V, with proportional control there between. The output of the DC-DC converter 50 can therefore take any value between 0 and 50 V, depending on the voltage (e.g., 0-5 V) that is applied to the analog voltage-control input. A controller 40 controls the output voltage of the DC-DC converter 50 by writing a control word to a digital-to-analog converter (DAC) 42. The DAC 42 then generates an analog voltage that is proportional to the control word, and this analog voltage is applied to the voltage-control input of the DC-DC converter 50.

The output of the DC-DC converter 50 is routed to the power switcher 60. The power switcher 60 has a control input, and depending on the state of the control input, it will route the output of the DC-DC converter 50 to the primary of the transformer 70 in either direction. More specifically, when a first control signal is applied to the control input, the power switcher 60 will apply the output of the DC-DC converter 50 to the primary of the transformer 70 in a first direction. When a second control signal is applied to the control input, the power switcher 60 will apply the output of the DC-DC converter 50 to the primary of the transformer 70 in a second direction that is opposite to the first direction. When neither the first control signal nor the second control signal is applied to the control input, the power switcher 60 will remain off, in which case power from the DC-DC converter 50 is not routed to the primary of the transformer 70.

Figure 2:
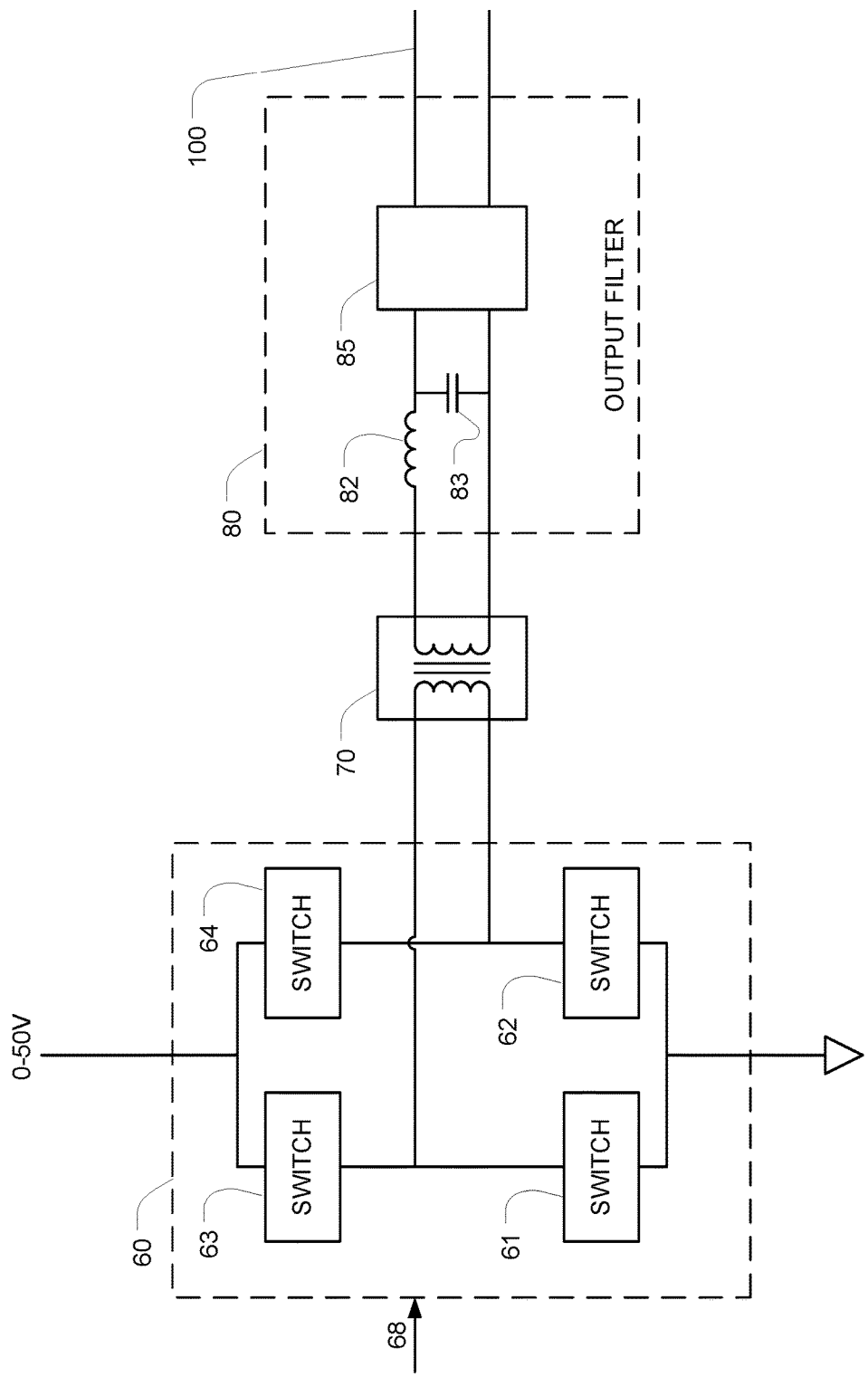
FIG. 2 depicts a block diagram of one preferred approach for implementing the power switcher and a suitable architecture for implementing the output filter.

FIG. 2 includes a block diagram of one preferred approach for implementing the power switcher 60 using a set of four electronically controlled switches 61-64 connected to the primary of the transformer 70 in an H-bridge configuration. These switches 61-64 open and close in response to signals that are applied to a control input 68. A wide variety of technologies may be used for implementing these switches, as will be appreciated by persons skilled in the relevant arts. For example, the switches 61-64 may be implemented using MOSFET transistors (e.g., BSC109N10NS3 manufactured by Infineon) along with appropriate logic to switch them on and off in response to a control signal. In order to apply the output of the DC-DC converter 50 to the primary of the transformer 70 in the first direction, only switches 63 and 62 should be closed. In order to apply the output of the DC-DC converter 50 to the primary of the transformer 70 in the opposite direction, only switches 61 and 64 should be closed. When all four of these switches 61-64 are off, no power is routed into the primary of the transformer 70.

Transformer 70 is preferably a step-up transformer with a step-up ratio between 1:4 and 1:9. In some preferred embodiments, transformer 70 is a step-up transformer with a step-up ratio of 1:6. For example, when a transformer with a 1:6 step-up ratio is used in combination with a DC-DC converter 50 that can output up to 24 V, the resulting voltage at the secondary of the transformer 70 can go as high as 300 V.

Figure 3:
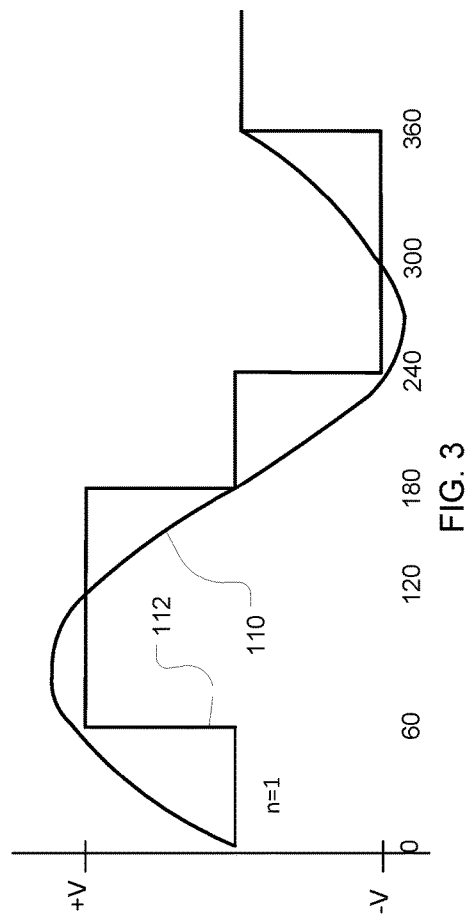
FIG. 3 depicts a sine wave and an oversampled version of that sine wave that is sampled 6 times per cycle.

Returning to FIG. 1, the sequencer 55 applies control signals to the control input of the power switcher 60 in a time-choreographed sequence in order to construct an oversampled version of a sine wave that is sampled six times per cycle using evenly spaced samples. More specifically, FIG. 3 depicts a sine wave 110 and an oversampled version of that sine wave 112 that is sampled at 0°, 60°, 120°, 180°, 240°, 300°, and 360°. Looking at this oversampled version 112, it becomes apparent that it contains only three voltage levels: a positive voltage +V between 60° and 180°, a negative voltage −V between 240° and 360°, and zero volts between 0° and 60° and also between 180° and 240°. Note that the zero Volt level exists because we have chosen the sampling times such that one of the sampling points occurs at 0° and another one of the sampling points occurs at 180°, where the sine function equals zero. This choice advantageously reduces the number of voltage levels that must be generated to construct the oversampled version 112 of the sine wave.

It also advantageously reduces the number of switching events, which minimizes losses that are incurred during the switching process.

As a result, an oversampled version of a sinusoid at a pre-set frequency f can be constructed at the output of the transformer 70 by continuously repeating the following four steps: (a) applying the first control signal to the control input 68 for a duration of T/3, which corresponds to the 60-180° segment of waveform 112 in FIG. 3; then (b) waiting for a duration of T/6, which corresponds to the 180-240° segment of waveform 112; then (c) applying the second control signal to the control input 68 for a duration of T/3, which corresponds to the 240-360° segment of waveform 112; and then (d) waiting for a duration of T/6, which corresponds to the 0-60° segment of waveform 112. Note that T is the reciprocal of the pre-set frequency f.

The sequencer 55 is responsible for generating these control signals in this sequence. The sequencer 55 may be implemented using a wide variety of approaches that will be apparent to persons skilled in the relevant arts including but not limited to state machines, counters, and microcontrollers.

The output of the secondary of the transformer 70 is routed to an output filter 80 that has a cut-off frequency between 2f and 4f. The output filter 80 passes the pre-set frequency f and attenuates frequencies above the cutoff frequency.

Note that when the oversampled version of the sine wave (112 in FIG. 3) is converted to the frequency domain, all of the even harmonics will be zero as a result of the fact that waveform 112 being symmetric. In addition, because sampling is performed 6 times per period, the third harmonic of waveform 112 will also be zero.

Many filter designs have inherent instabilities at their cutoff frequencies. But because the third harmonic component of the oversampled waveform 112 is zero, the lowest harmonic that will have any significant power will be the fifth harmonic. If the output filter 80 is designed so that its cutoff frequency coincides with the third harmonic, the oversampled waveform 112 will not be affected by the instabilities in the vicinity of the cutoff frequency, because the waveform contains no power at 3f. It is therefore most preferable to design the output filter 80 with its cutoff frequency at 3f, in which case (a) the fundamental component will be far enough below the cutoff frequency so as not to activate the instabilities and (b) the fifth harmonic will be far enough above the cutoff frequency so as not to activate the instabilities.

To further reduce the higher order harmonics, the output filter 80 is preferably designed so that the transfer function of the output filter has a zero located at the fifth harmonic. This may be accomplished, for example, by selecting the components within the output filter 80 to implement an elliptic low pass filter or a Chebyshev-2 low pass filter. Ordinarily, elliptic filters and Chebyshev-2 filters are not suitable for filtering square waves into sine waves because they have significant ripple in the stop band. As a result, if an incoming signal happens to contain a frequency component that coincides with a crest within that ripple, that component would not be filtered out from the incoming signal. The FIG. 1 embodiment avoids this situation by generating the oversampled waveform 112 at a pre-set frequency, which means that the frequency of the fifth harmonic will be known in advance. By selecting the components within the output filter 80 so that its transfer function has a zero at the fifth harmonic, we ensure that the fifth harmonic will never coincide with a crest within the ripple in the stop band.

To reduce the higher harmonics even further, the output filter 80 may be designed so that its transfer function has an additional zero located at the seventh harmonic. Here again, because the frequency of the seventh harmonic will be known in advance, the components within the output filter 80 can be selected so that its transfer function has a zero at the seventh harmonic.

Designing the output filter 80 with zeros at the fifth and seventh harmonics reduces the attenuation at other frequencies located between the harmonics, which would ordinarily be very undesirable. However, because the frequency of the oversampled waveform 112 is pre-set in advance and because it only contains signals centered around the odd harmonics (starting with the fifth harmonic), this design will actually decrease the overall distortion of the output signal in the FIG. 1 embodiment.

When the output filter 80 is designed with zeros at the fifth and seventh harmonics, the initial harmonic that will contain any significant power will be the ninth harmonic. But because the power in the ninth harmonic of the oversampled waveform 112 (in FIG. 3) is relatively low to begin with, and because the ninth harmonic is 6f above the cutoff frequency, the power in the ninth harmonic (and all higher harmonics) at the output 100 of the output filter 80 will be low enough to produce an excellent sine wave.

FIG. 2 depicts a suitable architecture for implementing the output filter 80 with the cutoff frequency and the zeros at the locations indicated above. Preferably, the output filter 80 is a multi-stage low pass LC filter. In this case, the first stage of the output filter 80 comprises inductor 82 and capacitor 83, and the subsequent stages are represented by block 85. In some embodiments, the filter 80 is a fourth order LC low pass filter. In some embodiments, the filter 80 is a dual M-type element low pass filter.

When the electrical characteristics of transformer 70 are modelled, the leakage inductance of the transformer appears in series with the secondary of transformer 70. As a result, this leakage inductance must be accounted for when calculating the inductance of the first inductor 82 in the first stage of the output filter 80. In some embodiments, a transformer 70 with a leakage inductance that is large enough to supply all of the inductance that is needed for the first inductor 82 is selected. In this case, the first inductor 82 can be eliminated entirely from the output filter 80 and replaced with a wire. For example, if the calculated desired value for the first inductor in the output filter is 60 µH and the leakage inductance of the transformer 70 is 60 µH, the first inductor 82 of the output filter can be eliminated entirely.

In alternative embodiments, the leakage inductance of the transformer 70 accounts for at least half of the inductance of the first stage of the low pass LC filter. In these embodiments, we start with the calculated value for the first inductor 82 and reduce that value by the leakage inductance of the transformer 70. For example, if the calculated value for the first inductor in the first stage of the output filter is 100 µH and the leakage inductance of the transformer 70 is 60 µH, a 40 µH inductor should be used as the first inductor 82 of the output filter (because 100 µH−60 µH=40 µH).

Figure 4:
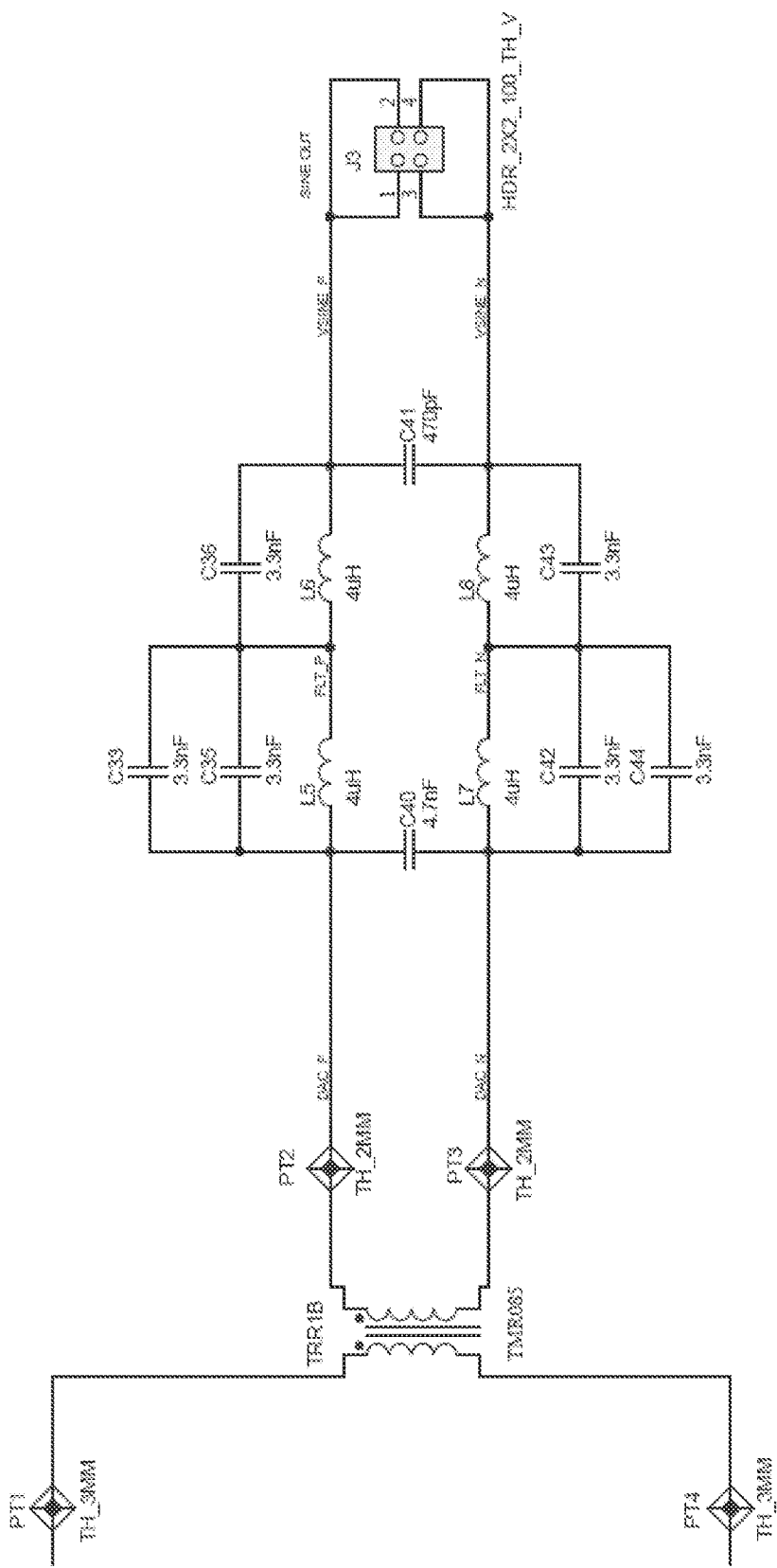
FIG. 4 is a schematic diagram of an embodiment of the output filter.

FIG. 4 is a schematic diagram of an embodiment of the output filter 80 in which the inductance of the transformer 70 provides all of the inductance that is needed to serve as the first inductor for the first stage of the output filter. The transformer in FIG. 4 is a Zolotov TRM085, which has the following characteristics: a turn ratio of 6:25; an inductance of 0.25 mH in the primary (at 200 kHz); an inductance of 4.5 mH in the secondary (at 200 kHz); and a leakage inductance between 32 and 36 pH (at 200 kHz). The capacitors C33, C35, C36, C42, C43, and C44 are all 3300 pF capacitors. C40 is a 4.7 nF capacitor. C41 is a 470 pF capacitor. The inductor L5-L8 are all 4 pH inductors. The values of these components were selected to position the zeros of the filter at the fifth harmonic and the seventh harmonic when the operating frequency is 200 kHz.

An alternative design for implementing an output filter 80 with an operating frequency of 150 kHz can be realized by starting with the schematic of FIG. 4 and (a) adding an additional 4.7 nF capacitor in parallel with C40; and (b) swapping in 5600 pF capacitors in place of the 3300 pF capacitors C33, C35, C36, C42, C43, and C44. These components were selected to position the zeros of the filter at the fifth harmonic and the seventh harmonic when the operating frequency is 150 kHz.

The output impedance of the output filter 80 is preferably as close as possible to 70 ohms. In alternative embodiments, the output impedance of the output filter 80 is between 40 and 120 ohms. Using an output impedance in this range is appropriate because the current and voltage of the output signal 100 can change depending on the load that is presented (i.e., the patient and the transducer arrays in the context of TTFields treatments). But because the output impedance is between 40 and 120 ohms, even if there is a short circuit on the exit, the current will not search to dangerous values. In addition, if the impedance of the load suddenly increases (e.g., if an electrode becomes partially disconnected from a patient), then the drop in current will be a lot less significant. This is very useful as a safety feature in the context of TTFields treatment.

The controller 40 controls the amplitude of the output signal 100 by adjusting the control signal that is applied to the voltage control input of the DC-DC converter 50. In the illustrated embodiment, this is accomplished by having the controller 40 write a control word to the DAC 42. The DAC 42 responds by outputting an analogue voltage, which serves as the control signal that is applied to the voltage-control input of the DC-DC converter 50. Assume, for example, that the output of the DAC 42 starts at 1 V, that the DC-DC converter is outputting 10 VDC, and that the transformer 70 has a step-up ratio of 1:6. Under these conditions, the pulses at the output of the secondary of the transformer 70 will be 60 V. When the controller 40 writes a new control word to the DAC 42 that causes the output of the DAC 42 to increase to 2 V. The DC-DC converter 50 will respond to the new signal that is being applied to its voltage-control input by increasing its output voltage to 20 V DC, which (after passing through the step up transformer 70) will cause the pulses at the output of the secondary of the transformer 70 to increase to 120 V.

Preferably, the voltage and/or current of the output signal 100 are monitored by a voltage sense circuit 92 and/or a current sense circuit 94. The output of these circuits 92, 94 is preferably fed back to the sequencer 55, and the sequencer 55 is preferably configured so that when and error condition is detected at the output 100 (e.g., overvoltage, overcurrent, severe voltage drop, etc.), the sequencer will shut down the power switcher 60 by inhibiting the generation of both the first control signal and the second control signal that are applied to the control input 68 of the power switcher 60. Optionally, shut down of the power switcher 60 may also be triggered by an over-temperature condition at the load by including appropriate temperature sensors and routing a signal back from those temperature sensors to the sequencer 55.

Optionally, the functionality of the controller 40 and the sequencer 55 may both be implemented in a single microcontroller that is programmed to perform the tasks of both the controller 40 and the sequencer 55.

In some embodiments, the output of the current sense circuit 94 and or the voltage sense circuit 92 is fed back to the controller 40. In these embodiments, the controller can adjust the voltage at the output of the DC-DC converter 50 by writing appropriate control words to the DAC 42 in order to adjust the current or voltage of the output signal 100 to a desired level. For example, when the controller 40 is set to adjust the current to a particular level and the output of the current sense circuit 94 indicate that the current is too low, the controller can increase the voltage at the output of the DAC 42, which will cause an increase in amplitude at the output signal 100. Similarly, if the output of the current sense circuit 94 indicate that the current is too high, the controller can decrease the voltage at the output of the DAC 42, which will cause a corresponding decrease in amplitude at the output signal 100.

In alternative embodiments, the transformer 70 (shown in FIGS. 1 and 2) can be omitted, in which case the two conductors at the output of the power switcher 60 are hooked up directly to the two conductors at the input of the output filter 80. But these alternative embodiments are less preferred, especially in situations when isolation is desirable and in situations where a high voltage output is desirable. In addition, these alternative embodiments cannot rely on the leakage inductance of the transformer to provide some or all of the inductance needed for the first stage of the filter.

Note that the design of the FIG. 1 embodiment stands in sharp contrast with the design of a conventional class D amplifier, because conventional class D amplifiers are designed to handle random input signals that can include frequency components anywhere within the operating range of the amplifier. The design of the FIG. 1 embodiment relies on advance knowledge of the incoming signal, and the intentional construction of both the signal and the output filter 80 so that the most significant harmonics are either inherently zero (e.g., the even harmonics and the third harmonic) or zeroed out by the output filter 80 (e.g., the fifth and seventh harmonics). This helps provide a very clean high voltage output signal at the desired frequency, with very high efficiency.

The FIG. 1 embodiment uses a single DC-DC converter 50, and implements six equally-spaced sampling points per cycle. In alternative embodiments, the number of sampling points may be increased to N=2+4n, where n is a positive integer. When n=1, we have the situation described above in connection with FIG. 1. When n=2, we have the situation described below in connection with FIG. 5, which uses two DC-DC converters. Other embodiments may be implemented for n>2 following the same framework using additional DC-DC converters and even more samples (following the rule that N=2+4n).

Figure 5:
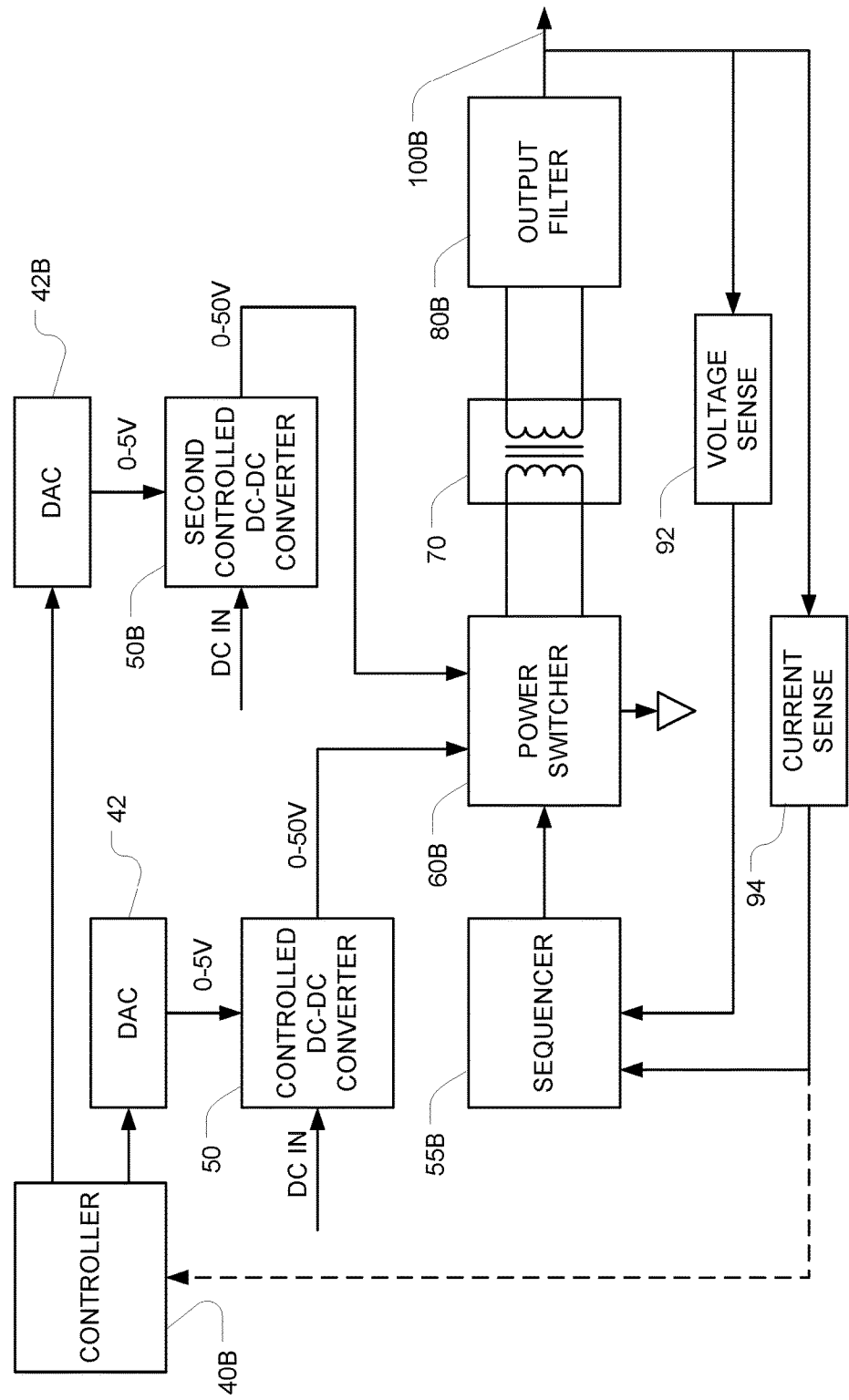
FIG. 5 is a block diagram of a second embodiment of a sinusoid generator that generates a sinusoid at a pre-set frequency f, with a controllable amplitude.

FIG. 5 is a block diagram of a second embodiment of a sinusoid generator that generates a sinusoid at a pre-set frequency f, with controllable amplitude, in which n=2. As a result, there are two DC-DC converters 50, 50B and (following the formula N=2+4n) 10 samples per cycle are used. Note that in the FIG. 5-6 embodiment, components with similar reference numbers operate in a manner similar to the description above in connection with the FIG. 1-2 embodiment.

Figure 7:
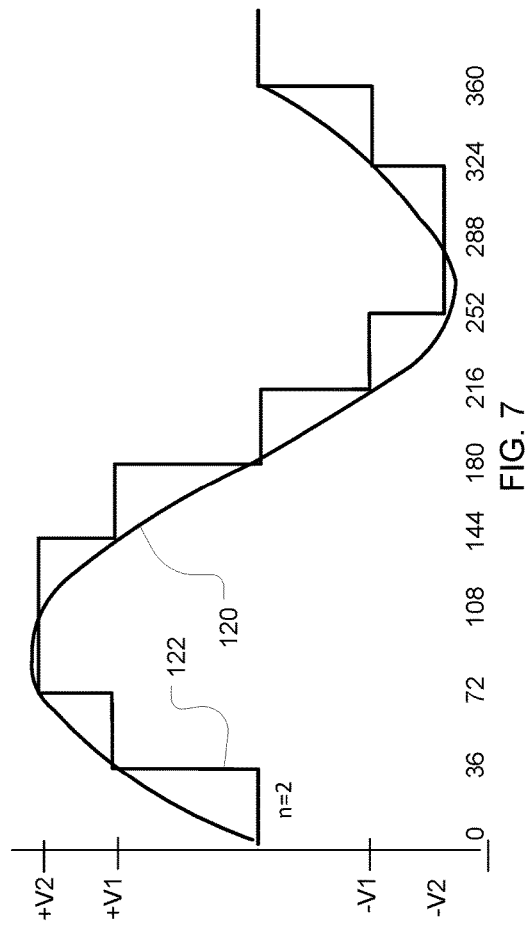
FIG. 7 depicts a sine wave and an oversampled version of that sine wave that is sampled 10 times per cycle

FIG. 7 depicts a sine wave 120 and an oversampled version of that sine wave 122 that is sampled 10 times per cycle (i.e., at 0°, 36°, 72°, . . . 324°, and 360°). Looking at this oversampled version 112, it becomes apparent that it contains only five voltage levels: a low positive voltage +V1, a higher positive voltage +V2, a low negative voltage −V1, a higher negative voltage −V2, and zero volts (between 0° and 36° and also between 180° and 216°). Here again, the zero Volt level exists because we have chosen the sampling times such that one of the sampling points occurs at 0° and another one of the sampling points occurs at 180°, where the sine function equals zero. This choice advantageously reduces the number of voltage levels that must be generated to construct the oversampled version 122 of the sine wave to two levels (i.e., V1 and V2).

As a result, a sequencer 55B can be used to control the generation of an oversampled version of a sine wave that is sampled N times per cycle using evenly spaced samples that include a sampling point at 0°, where N=2+4n, by setting the output voltages of the DC power sources to levels that are present on the oversampled version of the sine wave, and then sequencing the control signal through the 2n states and the additional off state, so that each of the DC power sources is applied to the primary of the transformer in each direction at appropriate times in a sequence so as to generate the oversampled version of the sine wave.

When n=2 (as it is in the FIG. 5-6 embodiment), an oversampled version of a sinusoid at a pre-set frequency f can be constructed at the output of the transformer 70 by continuously repeating the following eight steps: applying V1 to the primary of the transformer 70 in the first direction between 36° and 72°; applying V2 in the first direction between 72° and 144°; applying V1 in the first direction between 144° and 180°; remaining off between 180° and 216°; applying V1 in the second direction between 216° and 252°; applying V2 in the second direction between 252° and 324°; applying V1 in the second direction between 324° and 360°; and remaining off between 0° and 36°. Note that in order for the resulting waveform to properly track an oversampled version of a sinusoid (122 in FIG. 7), the ratio between V1 and V2 must remain constant. More specifically, the ratio V2/V1 must equal sin(72°)/sin(36°), which comes to 1.618.

The sequencer 55B is responsible for generating control signals that cause the power switcher 60B to apply these voltages to the transformer 70 in the sequence identified above. The sequencer 55B is similar to the sequencer 55 in the FIG. 1 embodiment, except that it sequences through 10 states per cycle instead of six states per cycle.

Figure 6:
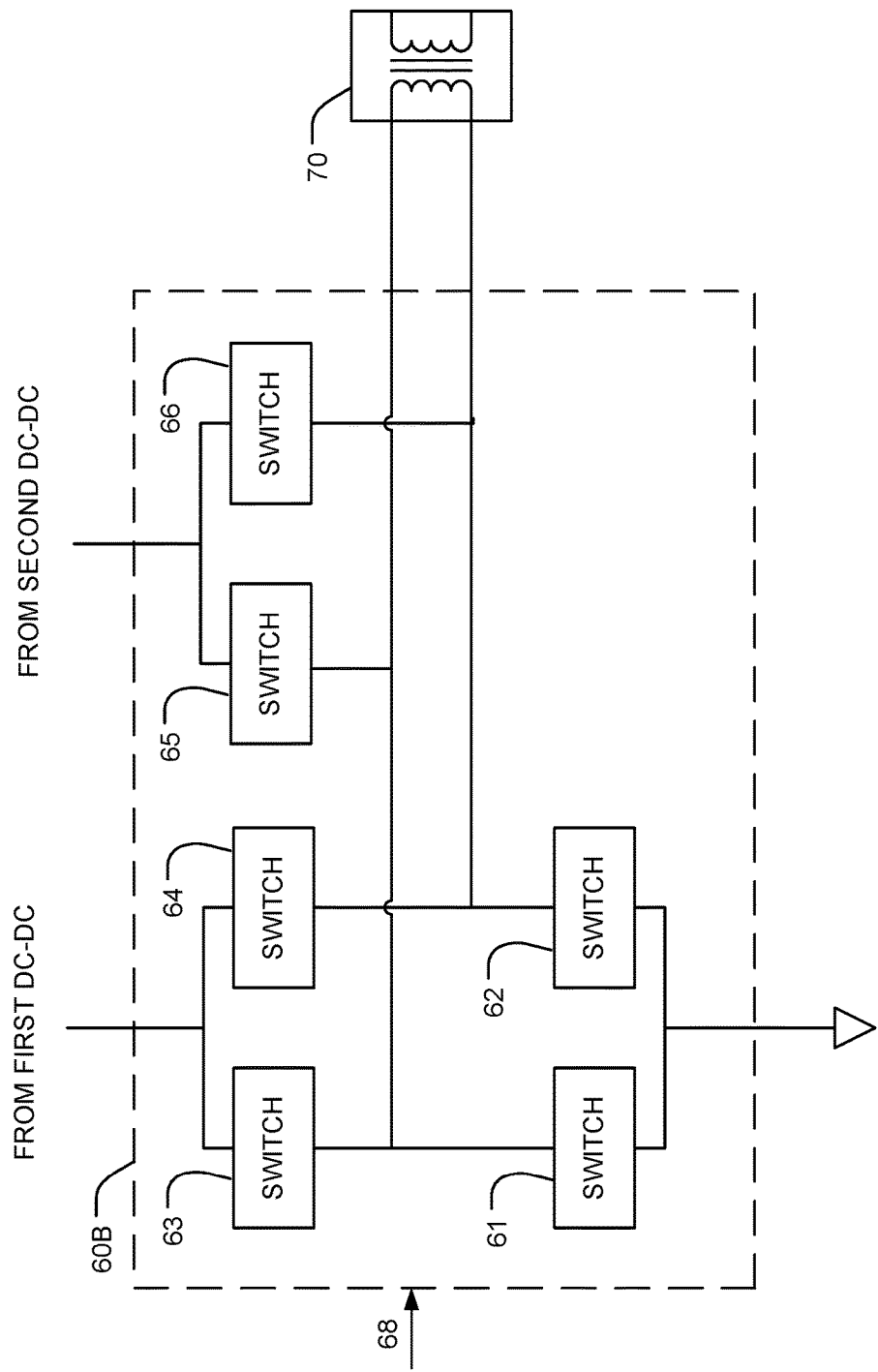
FIG. 6 is a block diagram of one preferred approach for implementing the power switcher in the FIG. 5 embodiment.

Referring now to FIG. 6, the power switch 60B has a control input 68, and the power switch is configured to either (a) apply the output of a selected one of the DC power sources to the primary of the transformer 70 in a selected direction in response to 2n states of a control signal that is applied to the control input 68 or (b) remain off in response to an additional state of the control signal.

FIG. 6 is a block diagram of one preferred approach for implementing the power switcher 60B. This power switcher is similar to the power switcher 60 of the FIG. 1 embodiment, except that it contains additional switches 65-66 for switching the output of the second DC-DC converter across the transformer 70 in either direction. More specifically, this power switcher 60B uses a set of six electronically controlled switches 61-66 connected to the primary of the transformer 70 as depicted in FIG. 6. These switches 61-66 (which are similar to the corresponding switches in the FIG. 1-2 embodiment) open and close in response to signals that are applied to a control input 68. In order to apply the output of the first DC-DC converter 50 to the primary of the transformer 70 in the first direction, only switches 63 and 62 should be closed. In order to apply the output of the first DC-DC converter 50 to the primary of the transformer 70 in the opposite direction, only switches 61 and 64 should be closed. In order to apply the output of the second DC-DC converter 50B to the primary of the transformer 70 in the first direction, only switches 65 and 62 should be closed. In order to apply the output of the second DC-DC converter 50B to the primary of the transformer 70 in the opposite direction, only switches 61 and 66 should be closed. When all six of these switches 61-66 are off, no power is routed into the primary of the transformer 70.

Returning to FIG. 5, an output filter 80B is connected to the secondary of the transformer 70, and the output filter passes the pre-set frequency f and attenuates frequencies above a cut-off frequency. The output filter 80B is similar to the output filter 80 in the FIG. 1-2 embodiment, except the location of the zeros in the transfer function of the output filter 80B must be adjusted to account for the different frequency content of the oversampled waveform 122 (shown in FIG. 7). More specifically, the output filter 80B should have a transfer function with a zero at a frequency where a harmonic of the pre-set frequency f is expected to contain power.

For example, because the waveform 122 has 10 samples per cycle, the initial harmonic that we would expect to appear will be the ninth harmonic. Accordingly, a transfer function with a zero at the ninth harmonic would be useful when this waveform 122 is being used. The cut off frequency of the filter should also be adjusted accordingly, based on the set of harmonics that are expected to appear (which can be calculated in advance by taking the Fourier transform of the waveform that is being used).

Optionally, the transfer function of the output filter 80B can also be designed to have a zero at the next frequency where a harmonic of the pre-set frequency f is expected to contain power. In the case of the waveform 122, this would be the eleventh harmonic.

The controller 40B controls an amplitude of the sinusoid at the output 100B of the output filter 80B by adjusting the output voltages of the DC power sources 50, 50B via their voltage-control inputs, while maintaining a fixed ratio between the output voltages of each of the DC power sources. In the illustrated embodiment, this is accomplished by writing appropriate control words to DAC 42 and DAC 42B, taking care to maintain the required ratio of sin (72°)/sin(36°) as described above. In alternative embodiments, the second DAC 42B can be eliminated, and replaced by a 1.618× hardware multiplier that is inserted between the output of DAC 42 and the voltage control input to the second DC-DC converter 50B.

In alternative embodiments, the transformer 70 can be omitted from the FIG. 5 embodiment, in which case the two conductors at the output of the power switcher 60B are hooked up directly to the two conductors at the input of the output filter 80B. But these embodiments are less preferred for the same reasons discussed above in connection with FIG. 1.

Note that the system descried above is suitable for generating high voltage signals of any shape, as long as the pulse train that will result in these signals can be determined before use either through calculations or experiments, and the filters are designed accordingly.

When the output signal generated by the system is applied to electrodes to generate TTFields (as described in U.S. Pat.

No. 7,805,201) changes in the load associated with the body of the patient and the transducer arrays can change the output signal due to interactions with the output filter. This means that any changes to this load (e.g., lifting of a disk off a patient's body, short circuiting etc.) immediately influence the output signal, which is constantly monitored. Hence, it is possible for the device to respond very quickly to these changes (e.g., by shutting down the power switcher 60 in response to the detection of a short circuit or overload condition).

Notably, in the embodiments described above, the exact shape of the output signal is known in advance at every moment because we are generating a sine wave at a known frequency. It is only the amplitude of the output signal that changes over time based on the controller responding to external inputs (e.g., current measurements or temperature measurements). Furthermore, the rate at which the output signal has to change is very slow (i.e., on the order of seconds or tens of seconds). The embodiments described above can advantageously be used to generate very clean narrow band limited signals in the frequency range of 100-500 kHz, with very low losses and very low sensitivity to the external load to which the signal generator is connected.

In alternative embodiments, the system can be used to generate a sinusoid at any desired frequency within a pre-set range by building the filter using a component with a tunable reactance (e.g. a tunable capacitance or a tunable inductance). In these embodiments, the reactance of the tunable components is set to imbue the filter with the desired transfer function characteristics. Then, an appropriate oversampled sinusoid is generated and fed into the filter as discussed above in connection with FIGS. 1 and 5.

In other alternative embodiments, the system can be used to generate a finite number of pre-defined signals at a plurality of different pre-set frequencies. These embodiments can be implemented by saving the characteristics of the pulse trains for each of the pre-defined signals in a look up table, and providing a bank of filters that can be selectively switched in to the signal path so as to provide the filtering characteristics necessary to generate the desired one of the pre-defined signals. When using the system to generate one of the pre-defined signals, the characteristics of the required pulse train are retrieved from memory and the appropriate filter (i.e., the one that matches this pulse train) is switched in to the signal path.

In other alternative embodiments, composite signals that contain a small number of discrete frequencies (e.g., between two and five frequencies) can be generated by generating an oversampled version of the composite signal, and passing the oversampled version of the composite signal through an appropriate filter.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. An apparatus for generating a sinusoid at a pre-set frequency f, the apparatus comprising:
    a DC power source having a voltage-control input that sets an output voltage of the DC power source;
    a transformer having a primary and a secondary;
    a power switch having a control input, wherein the power switch is configured to apply the output of the DC power source to the primary of the transformer in a first direction when a first control signal is applied to the control input, apply the output of the DC power source to the primary of the transformer in a second direction when a second control signal is applied to the control input, and remain off when neither the first control signal nor the second control signal is applied to the control input, wherein the second direction is opposite to the first direction;
    a sequencer configured to (a) apply the first control signal to the control input for a duration of T/3, then (b) to wait for a duration of T/6, then (c) to apply the second control signal to the control input for a duration of T/3, and then (d) to wait for a duration of T/6, then to continuously repeat the sequence (a), (b), (c), and (d), wherein T is the reciprocal of the pre-set frequency f; and
    an output filter connected to the secondary of the transformer, wherein the output filter passes the pre-set frequency f and attenuates frequencies above a cut-off frequency, wherein the cut-off frequency is between 2f and 4f, and wherein the output filter has a transfer function with a zero at 5f.

2. The apparatus of claim 1, further comprising a controller programmed to control an amplitude of the sinusoid at the pre-set frequency by adjusting a third control signal that is applied to the voltage-control input of the DC power source.

3. The apparatus of claim 2, further comprising a sensor that detects an output current of the apparatus, wherein the controller is programmed to increase the amplitude of the sinusoid when the detected output current is lower than a desired current, and to decrease the amplitude of the sinusoid when the detected output current is higher than the desired current.

4. The apparatus of claim 3, wherein the sequencer inhibits generation of both the first control signal and the second control signal when the output current detected by the sensor is indicative of an error condition.

5. The apparatus of claim 1, wherein the transfer function of the output filter has an additional zero at 7f.

6. The apparatus of claim 5, wherein the output filter comprises a low pass elliptic filter.

7. The apparatus of claim 6, wherein the cut-off frequency of the output filter is at or near 3f.

8. The apparatus of claim 1, wherein the cut-off frequency of the output filter is at or near 3f.

9. The apparatus of claim 1, wherein the output filter is a multi-stage low pass LC filter, and a leakage inductance of the transformer provides at least half of the inductance of a first stage of the low pass LC filter.

10. The apparatus of claim 1, wherein the output filter is a multi-stage low pass LC filter, and a leakage inductance of the transformer provides all of the inductance of a first stage of the low pass LC filter.

11. The apparatus of claim 1, wherein the output filter has an output impedance of 70 ohms.

12. The apparatus of claim 1, wherein the output filter has an output impedance between 40 and 120 ohms.

13. The apparatus of claim 1, wherein the pre-set frequency f is 200 kHz.

14. The apparatus of claim 1, wherein the pre-set frequency f is 150 kHz.

15. The apparatus of claim 1, wherein the power switch has an H-bridge configuration.

16. An apparatus for generating a sinusoid at a pre-set frequency f, the apparatus comprising:
- n DC power sources, each of the n DC power sources having a voltage-control input that sets an output voltage of the respective power source, wherein n is a positive integer;
- a transformer having a primary and a secondary;
- a power switch having a control input, wherein the power switch is configured to either (a) apply the output of a selected one of the n DC power sources to the primary of the transformer in a selected direction in response to 2n states of a control signal that is applied to the control input or (b) remain off in response to an additional state of the control signal;
- a sequencer configured to control the generation of an oversampled version of a sine wave that is sampled N times per cycle using evenly spaced samples that include a sampling point at 0°, where N=2+4n, by setting the output voltages of the n DC power sources to levels that are present on the oversampled version of the sine wave, and then sequencing the control signal through the 2n states and the additional state, so that each of the n DC power sources is applied to the primary of the transformer in each direction at appropriate times in a sequence so as to generate the oversampled version of the sine wave; and
- an output filter connected to the secondary of the transformer, wherein the output filter passes the pre-set frequency f and attenuates frequencies above a cut-off frequency, and wherein the output filter has a transfer function with a zero at a frequency where a harmonic of the pre-set frequency f is expected to contain power, and
- wherein a controller is configured to control an amplitude of the sinusoid by adjusting the output voltages of the n DC power sources via the voltage-control inputs, while maintaining a fixed ratio between the output voltages of each of the n DC power sources.

17. The apparatus of claim 16, wherein the transfer function of the output filter has an additional zero at a next frequency where a harmonic of the pre-set frequency f is expected to contain power.

18. The apparatus of claim 16, wherein the cut-off frequency of the output filter is at or near 3f.

19. The apparatus of claim 16, wherein the output filter is a multi-stage low pass LC filter, and a leakage inductance of the transformer provides at least half of the inductance of a first stage of the low pass LC filter.

20. The apparatus of claim 16, wherein the output filter is a multi-stage low pass LC filter, and a leakage inductance of the transformer provides all of the inductance of a first stage of the low pass LC filter.

21. The apparatus of claim 16, further comprising:
- a second output filter that passes a second pre-set frequency f2 and attenuates frequencies above a second cut-off frequency, wherein the second output filter has a transfer function with a zero at a frequency where a harmonic of the second pre-set frequency f2 is expected to contain power; and
- a switch that selectively connects either the output filter or the second output filter to the secondary of the transformer.

22. The apparatus of claim 16, wherein the output filter includes at least one component with a tunable reactance.

23. An apparatus for generating a sinusoid at a pre-set frequency f, the apparatus comprising:
- n DC power sources, each of the n DC power sources having a voltage-control input that sets an output voltage of the respective power source, wherein n is a positive integer;
- a power switch having output terminals and a control input, wherein the power switch is configured to either (a) switch the output of a selected one of the n DC power sources across the output terminals in a selected direction in response to 2n states of a control signal that is applied to the control input or (b) remain off in response to an additional state of the control signal;
- a sequencer configured to control the generation of an oversampled version of a sine wave that is sampled N times per cycle using evenly spaced samples that include a sampling point at 0°, where N=2+4n, by setting the output voltages of the n DC power sources to levels that are present on the oversampled version of the sine wave, and then sequencing the control signal through the 2n states and the additional state, so that each of the n DC power sources is switched across the output terminals in each direction at appropriate times in a sequence so as to generate the oversampled version of the sine wave; and
- an output filter that filters a signal received from the output terminals of the power switch, wherein the output filter passes the pre-set frequency f and attenuates frequencies above a cut-off frequency, and wherein the output filter has a transfer function with a zero at a frequency where a harmonic of the pre-set frequency f is expected to contain power,
- wherein a controller controls an amplitude of the sinusoid by adjusting the output voltages of the n DC power sources via the voltage-control inputs, while maintaining a fixed ratio between the output voltages of each of the n DC power sources.

24. The apparatus of claim 23, wherein the transfer function of the output filter has an additional zero at a next frequency where a harmonic of the pre-set frequency f is expected to contain power.

25. The apparatus of claim 23, wherein the cut-off frequency of the output filter is at or near 3f.

26. The apparatus of claim 23, further comprising:
- a second output filter that passes a second pre-set frequency f2 and attenuates frequencies above a second cut-off frequency, wherein the second output filter has a transfer function with a zero at a frequency where a harmonic of the second pre-set frequency f2 is expected to contain power; and
- a switch that selectively connects either the output filter or the second output filter to the secondary of the transformer.

27. The apparatus of claim 23, wherein the output filter includes at least one component with a tunable reactance.

28. A method for generating a sinusoid at a pre-set frequency f, the method comprising:
- setting n DC power sources to respective output voltages, wherein n is a positive integer;
- generating an oversampled version of a sine wave that is sampled N times per cycle using evenly spaced samples that include a sampling point at 0°, where N=2+4n, by setting the output voltages of the n DC power sources to levels that are present on the oversampled version of the sine wave, and then switching the outputs of the n DC power sources to an output in a controlled sequence such that each of the n DC power sources is switched to the output in each direction at appropriate times in the sequence so as to generate the oversampled version of the sine wave; and filtering the oversampled version of the sine wave to pass the pre-set frequency f and attenuate frequencies above a cut-off frequency, wherein the filtering implements a transfer function with a zero at a frequency where a harmonic of the pre-set frequency f is expected to contain power, wherein the amplitude of the sinusoid is controlled by adjusting the output voltages of the n DC power sources.

29. The method of claim 28, wherein n equals 1.

30. The method of claim 29, wherein the cut-off frequency is at or near 3f.

31. The method of claim 28, wherein n is greater than 1, and the amplitude of the sinusoid is controlled by adjusting the output voltages of the n DC power sources, while maintaining a fixed ratio between the output voltages of each of the n DC power sources.

32. The method of claim 28, wherein the transfer function has an additional zero at a next frequency where a harmonic of the pre-set frequency f is expected to contain power.

\* \* \* \* \*